(12) United States Patent
Vakhutinsky et al.

(10) Patent No.: US 11,514,374 B2
(45) Date of Patent: Nov. 29, 2022

(54) METHOD, SYSTEM, AND NON-TRANSITORY COMPUTER READABLE MEDIUM FOR AN ARTIFICIAL INTELLIGENCE BASED ROOM ASSIGNMENT OPTIMIZATION SYSTEM

(71) Applicant: Oracle International Corporation, Redwood Shores, CA (US)

(72) Inventors: Andrew Vakhutinsky, Sharon, MA (US); Setareh Borjian Boroujeni, Burlington, MA (US); Saraswati Yagnavajhala, Johns Creek, GA (US); Jorge Luis Rivero Perez, Naples, FL (US); Dhruv Agarwal, Delhi (IN); Akash Chatterjee, Gurgaon (IN)

(73) Assignee: Oracle International Corporation, Redwood Shores, CA (US)

( * ) Notice: Subject to any disclaimer, the term of this patent is extended or adjusted under 35 U.S.C. 154(b) by 100 days.

(21) Appl. No.: 16/736,284

(22) Filed: Jan. 7, 2020

(65) Prior Publication Data
US 2021/0117873 A1    Apr. 22, 2021

Related U.S. Application Data

(60) Provisional application No. 62/923,774, filed on Oct. 21, 2019.

(51) Int. Cl.
  *G06Q 10/02*    (2012.01)
  *G06Q 10/06*    (2012.01)
  (Continued)

(52) U.S. Cl.
  CPC ............ *G06Q 10/02* (2013.01); *G06Q 10/04* (2013.01); *G06Q 10/06314* (2013.01); *G06Q 50/12* (2013.01)

(58) Field of Classification Search
CPC .. G06Q 10/02; G06Q 10/04; G06Q 10/06314; G06Q 50/12
(Continued)

(56) References Cited

U.S. PATENT DOCUMENTS

| 7,167,834 B1 | 1/2007 | Kelly et al. |
| 8,145,536 B1 * | 3/2012 | Goel ...................... G06Q 30/08 |
| | | 705/26 |

(Continued)

FOREIGN PATENT DOCUMENTS

| EP | 2120194 A1 | 11/2009 | |
| WO | WO 2013131186 A1 * | 9/2013 | ........... G06F 9/5038 |

OTHER PUBLICATIONS

Peter L. Ivănescu, Some Network Flow Problems Solved with Pseudo-Boolean Programming, May-Jun. 1965, INFORMS, vol. 13, No. 3, pp. 388-399. (Year: 1965).*

(Continued)

*Primary Examiner* — Allison G Wood
*Assistant Examiner* — John G Webster
(74) *Attorney, Agent, or Firm* — Potomac Law Group, PLLC (57) ABSTRACT

Embodiments provide optimized room assignments for a hotel in response to receiving a plurality of hard constraints and soft constraints and receiving reservation preferences and room features. The optimization includes determining a guest satisfaction assignment cost based on the reservation preferences and room features, determining an operational efficiency assignment cost, generating a weighted cost matrix based on the guest satisfaction assignment cost and the operational efficiency assignment cost, and generating preliminary room assignments based on the weighted cost matrix. When the preliminary room assignments are feasible, the preliminary room assignments are the optimized (Continued)

room assignments comprising a feasible selection of elements of the matrix. When the preliminary room assignments are infeasible, embodiments relax one or more constraints and repeat the performing optimization until the preliminary room assignments are feasible.

20 Claims, 8 Drawing Sheets

(51) Int. Cl.
*G06Q 50/12* (2012.01)
*G06Q 10/04* (2012.01)

(58) Field of Classification Search
USPC .......................................... 705/5, 7.31, 7.18
See application file for complete search history.

(56) References Cited

U.S. PATENT DOCUMENTS

| | | |
|---|---|---|
| 2001/0021914 A1 | 9/2001 | Jacobi et al. |
| 2005/0144075 A1 | 6/2005 | Magowan et al. |
| 2006/0149586 A1* | 7/2006 | Brown ............... G06Q 50/12 235/382 |
| 2006/0229932 A1 | 10/2006 | Zollo et al. |
| 2007/0075136 A1 | 4/2007 | Jacob |
| 2009/0287629 A1* | 11/2009 | Gabriel ............... G06Q 10/02 705/5 |
| 2010/0121665 A1* | 5/2010 | Boyer ............... G06Q 10/109 705/9 |
| 2010/0185579 A1 | 7/2010 | Hong et al. |
| 2011/0087679 A1 | 4/2011 | Rosato et al. |
| 2011/0295762 A1 | 12/2011 | Scholz et al. |
| 2013/0151462 A1 | 6/2013 | Ledlie |
| 2013/0246146 A1 | 9/2013 | Fischer et al. |
| 2014/0207947 A1 | 7/2014 | Thomas et al. |
| 2014/0222518 A1 | 8/2014 | Adkins |
| 2014/0278683 A1* | 9/2014 | Kennell ............. G06Q 10/1053 705/7.19 |
| 2014/0310072 A1 | 10/2014 | Wojciechowski |
| 2015/0310300 A1 | 10/2015 | Hou et al. |
| 2016/0170996 A1 | 6/2016 | Frank et al. |
| 2016/0267402 A1 | 9/2016 | Szabo |
| 2017/0068890 A1* | 3/2017 | Thompson ............. G06N 3/126 706/11 |
| 2018/0047036 A1 | 2/2018 | Zhang et al. |
| 2019/0095454 A1 | 3/2019 | Sahadi |
| 2019/0156440 A1* | 5/2019 | Wang ..................... G06Q 50/12 705/15 |
| 2019/0205939 A1 | 7/2019 | Lal et al. |

OTHER PUBLICATIONS

Viviana Perdomo, Operating Theatre Scheduling Using Lagrangian Relaxation, Feb. 26, 2007, IEEE, 10.1109/ICSSSM.2006.320685 (Year: 2007).*

Daniel Elizalde, How to Use a Scorecard to Prioritize Features, Mar. 13, 2019, IoT Strategy for Product Teams (Year: 2019).*

Xun Xu, "The antecedents of customer satisfaction and dissatisfaction toward various types of hotels: A text mining approach", May 2016, International Journal of Hospitality Management, vol. 55, pp. 57-69. (Year: 2016).*

Rajiv Banker, "Association of Nonfinancial Performance Measures with the Financial Performance of a Lodging Chain", Nov. 2005, Cornell University, vol. 46, No. 4, pp. 394-412. (Year: 2005).*

Xun Xu, "The antecedents of customer satisfaction and dissatisfaction toward various types of hotels: A text mining approach", May 2016, International Journal of Hospitality Management, vol. 55, pp. 57-69. (Year: 2016) (Year: 2016).*

Li, Y., Wang, B. and Caudillo-Fuentes, L.A. (2013) Modeling a hotel room assignment problem. Journal of Revenue and Pricing Management 12: 120-127.

Friedman et al., "Regularization Paths for Generalized Linear Models via Coordinate Descent", Journal of Statistical Software, Jan. 2010, vol. 33, issue 1.

International Search Report and Written Opinion issued in the corresponding International Application No. PCT/US2020/046618, dated Nov. 18, 2020.

International Search Report and Written Opinion issued in the corresponding International Application No. PCT/US2020/046611, dated Nov. 18, 2020.

Gong, "A Collaborative Filtering Recommendation Algorithm Based on User Clustering and Item Clustering," Journal of Software, 2010, vol. 5.7, pp. 1-2 (Abstract only).

Ramzan et al., "An Intelligent Data Analysis for Recommendation Systems Using Machine Learning," Scientific Programming, 2019, pp. 1-2, (abstract only), Hindawi Limited.

* cited by examiner

Fig. 1

|  | Day 1 | Day 2 | | Day 1 | Day 2 | |
|---|---|---|---|---|---|---|
| Room 1 | Reservation A | Reservation B | Non-optimal (no space for 2-day Reservation C) | Reservation A | Reservation B | Optimal (can fit 2-day Reservation C) |
| Room 2 | Reservation B | Reservation C | | Reservation A | Reservation C | |

Preferences for Reservation ID: 142456

| Rooms | MB (Minibar) | CM (Coffee Machine) | BT (Bathtub) | Cost (% of unavailable preferences) |
|---|---|---|---|---|
| 101 | 1 | 0 | 0 | 0.66 |
| 102 | 1 | 1 | 1 | 0 |
| 103 | 0 | 1 | 1 | 0.33 |

Cost Matrices

DAY 1

|  | Room1 | Room2 | Room3 |
|---|---|---|---|
| Res1 (2 days) | 0.42 | 0.45 | 0.50 |
| Res2 | 0.45 | 0.60 | 0.40 |
| Res3 | 0.48 | 0.32 | 0.30 |

Cost when Day 1 is considered first: 1.14 + 1.22 = 2.36

|  | Room1 | Room2 | Room3 |
|---|---|---|---|
| Res1 (2 days) |  | 0.45 | 0.50 |
| Res2 | 0.45 | 0.60 |  |
| Res3 | 0.48 |  | 0.30 |

Cost when Day 2 is considered first: 1.27 + 0.85 = 2.12

|  | Room1 | Room2 | Room3 |
|---|---|---|---|
| Res1 (2 days) | 0.42 | 0.45 |  |
| Res2 |  | 0.60 | 0.40 |
| Res3 | 0.48 |  | 0.30 |

DAY 2

|  | Room1 | Room2 | Room3 |
|---|---|---|---|
| Res1 (2 days) | 0.42 | 0.45 | 0.50 |
| Res4 | 0.10 | 0.60 | 0.55 |
| Res5 | 0.35 | 0.25 | 0.40 |

|  | Room1 | Room2 | Room3 |
|---|---|---|---|
| Res1 (2 days) |  | 0.45 | 0.50 |
| Res4 | 0.10 | 0.60 |  |
| Res5 | 0.35 |  | 0.40 |

|  | Room1 | Room2 | Room3 |
|---|---|---|---|
| Res1 (2 days) | 0.42 | 0.45 |  |
| Res4 |  | 0.60 | 0.55 |
| Res5 |  | 0.35 | 0.40 |

METHOD, SYSTEM, AND NON-TRANSITORY COMPUTER READABLE MEDIUM FOR AN ARTIFICIAL INTELLIGENCE BASED ROOM ASSIGNMENT OPTIMIZATION SYSTEM

CROSS REFERENCE TO RELATED APPLICATIONS

This application claims priority of U.S. Provisional Patent Application Ser. No. 62/923,774, filed on Oct. 21, 2019, the disclosure of which is hereby incorporated by reference.

FIELD

One embodiment is directed generally to a computer system, and in particular to a computer system that provides artificial intelligence based room assignment optimization.

BACKGROUND INFORMATION

On a daily basis, a hotel chain operator (or any other type of service that assigns rooms for guests) normally solves the problem of optimal room assignment by manually assigning the reservations for the guests who are expected to arrive on that particular day. However, multiple objectives that fall under two main categories need to be considered for optimal room assignments. These categories are "hotel operations" and "guest satisfaction." The former is to minimize the total room maintenance cost by minimizing the number of unnecessary upgrades, while equalizing the room wear and tear, as well as increasing the room availability by minimizing the one or two day gaps in room usage. The latter is to match guest request constraints by providing them with the same or better room category than the one that was booked in the reservation system.

Guest requests are usually considered as soft constraints that can be violated in order to satisfy the hard constraints such as handicapped-accessible room, as defined by the Americans with Disabilities Act ("ADA"), smoking preferences, room capacity, and allowed room category substitutions. Lastly, as hotel guests book their rooms through different channels, such as hotel's own website or phone system, corporate agreement or online travel agency ("OTA"), the hotel operator may assign different importance score to the guest based on their booking channels, frequency of stay (e.g., number of points in the hotel program), and other factors. This implicit definition of guest importance score is utilized to prioritize the allocation of one guest over another in order to maximize guest satisfaction and build customer loyalty.

SUMMARY

Embodiments provide optimized room assignments for a hotel in response to receiving a plurality of hard constraints and soft constraints and receiving reservation preferences and room features. The optimization includes determining a guest satisfaction assignment cost based on the reservation preferences and room features, determining an operational efficiency assignment cost, generating a weighted cost matrix based on the guest satisfaction assignment cost and the operational efficiency assignment cost, and generating preliminary room assignments based on the weighted cost matrix. When the preliminary room assignments are feasible, the preliminary room assignments are the optimized room assignments comprising a feasible selection of elements of the matrix. When the preliminary room assignments are infeasible, embodiments relax one or more constraints and repeat the performing optimization until the preliminary room assignments are feasible.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Embodiments optimize hotel room assignments for existing hotel reservations by assigning rooms for a horizon of days from the current day, taking into account future reservations and room availability, subject to specific requests and accommodation constraints of the hotel guests, as well as operational constraints of the hotel. Embodiments use artificial intelligence with an optimization objective to minimize the hotel operating costs as well as the mismatch between the guests' requests with the assigned room features while prioritizing the assignments according to the importance of the guests as defined by the hotel chain.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
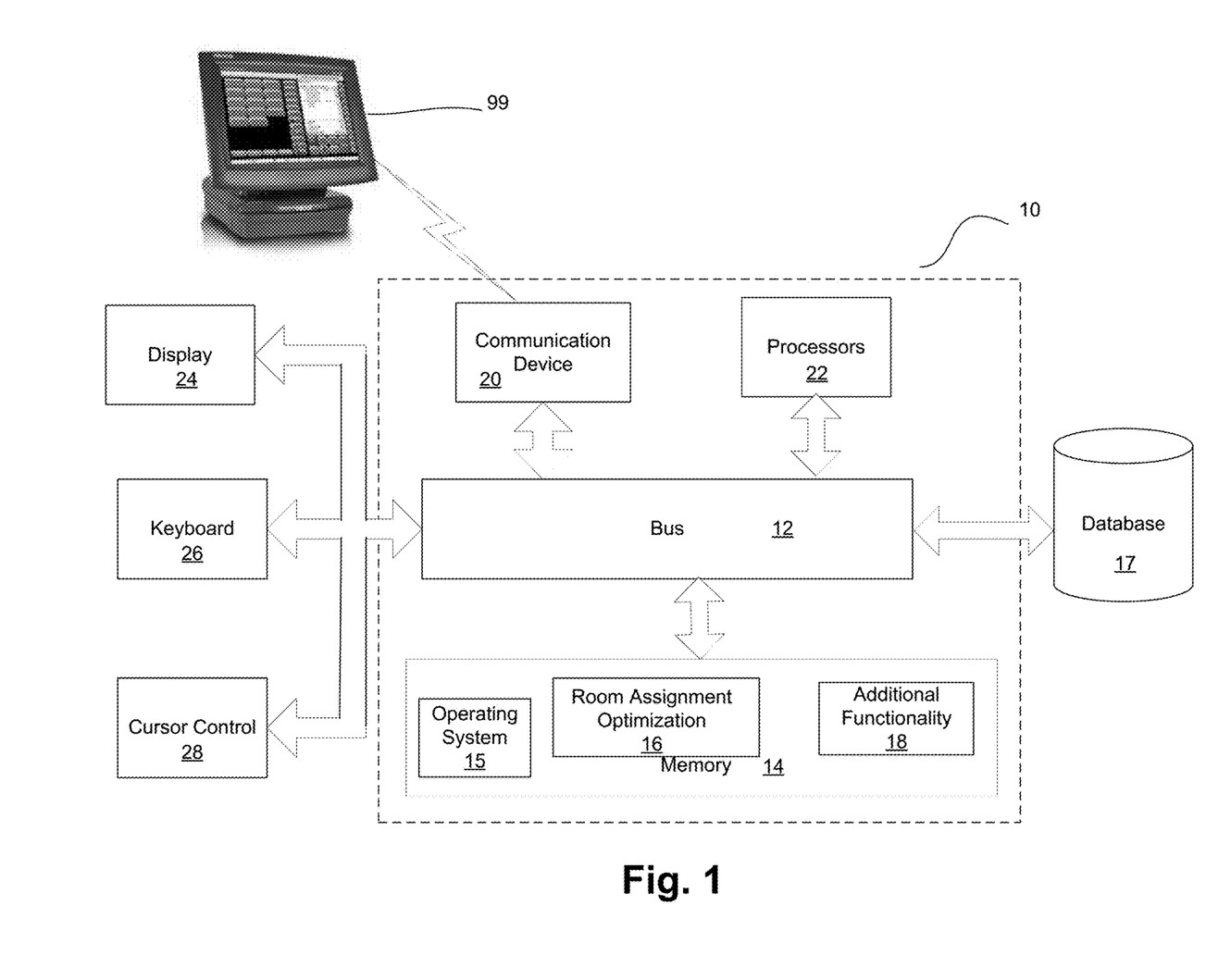
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, when implemented as a web server or cloud based functionality, system 10 is implemented as one or more servers, and user interfaces such as displays, mouse, etc. are not needed.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include room assignment optimization module 16 that optimizes room assignments, and all other functionality disclosed herein. System 10 can be part of a larger system. Therefore, system 10 can include one or more additional functional modules 18 to include the additional functionality, such as the functionality of a Property Management System ("PMS") (e.g., the "Oracle Hospitality OPERA Property" or the "Oracle Hospitality OPERA Cloud Services") or an enterprise resource planning ("ERP") system. A database 17 is coupled to bus 12 to provide centralized storage for modules 16 and 18 and store guest data, hotel data, transactional data, etc. In one embodiment, database 17 is a relational database management system ("RDBMS") that can use Structured Query Language ("SQL") to manage the stored data. In one embodiment, a specialized point of sale ("POS") terminal 99 generates transactional data and historical sales data (e.g., data concerning transactions of hotel guests/customers) used for performing the optimization. POS terminal 99 itself can include additional processing functionality to perform room assignment optimization in accordance with one embodiment and can operate as a specialized room assignment optimization system either by itself or in conjunction with other components of FIG. 1.

In one embodiment, particularly when there are a large number of hotel locations, a large number of guests, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Figure 2:
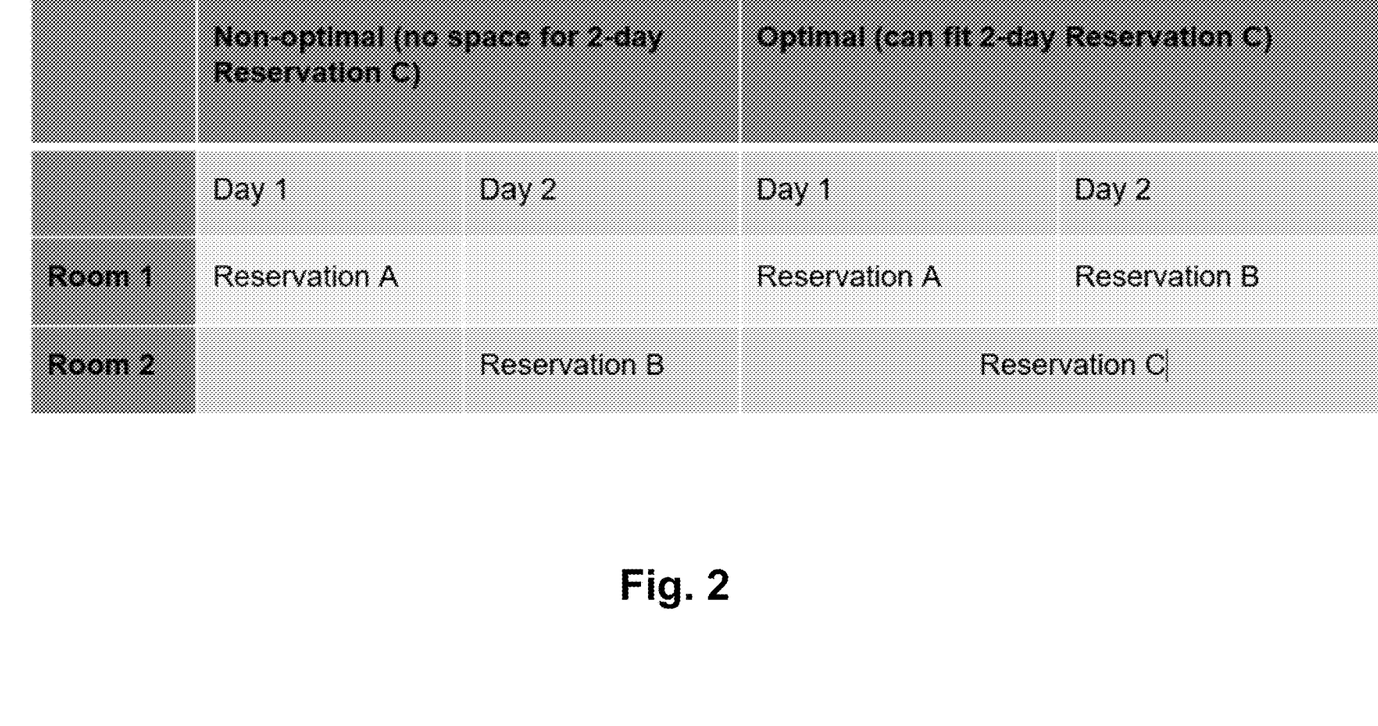
FIG. 2 is a chart that contrasts sub-optimal room assignments with optimal room assignments in accordance to embodiments.

As described, optimizing room assignments is a difficult problem to solve. FIG. 2 is a chart that contrasts sub-optimal room assignments with optimal room assignments in accordance to embodiments. When two single-night reservations A and B, starting on two consecutive days, are assigned to two different rooms (i.e., sub-optimal), the third reservation C cannot be assigned to any of these rooms. However, when the reservations A and B are assigned to the same room (i.e., optimal), the reservation C can be assigned to the other room.

Currently, most hotel operators generally perform the room assignment manually by assigning the rooms to the individual reservations through an intuitive domain understanding, which is labor-intensive and, in many cases, results in assignments that are far from optimal. Some known solutions solve the problem using Mixed Integer Linear Programming ("MILP"). However, this approach may take an excessively long time to run and requires a licensed 3rd-party software library at the hotel operator site, which may become a complicating issue for the development and deployment of the solution. In contrast, embodiments of the invention provide an optimized solution while improving the performance of the computer system that executes the functionality by running efficiently regardless of the number of active reservations.

In general, the problem solved by embodiments is to find the most optimal assignment from the available room inventory given a set of incoming reservations and guest preferences in order to minimize the mismatch of requested room features while keeping hotel operation costs low. In general, this is currently a time-consuming manual process undertaken by the hotel staff on a day-to-day basis. While a satisfactory assignment might be achieved for a single day period, the complexity increases exponentially with increase in the reservation planning horizon.

In contrast, embodiments implement an automatic room assignment process through a data-driven optimization algorithm. Embodiments build a multi-objective function leveraging factors such as reservation preferences, guest importance, and upgrade costs, to simulate the hard and soft business constraints. In addition, embodiments differentially weigh guests' satisfaction and hotel operational efficiency in order to provide a configurable solution for changing business dynamics.

Figure 3:
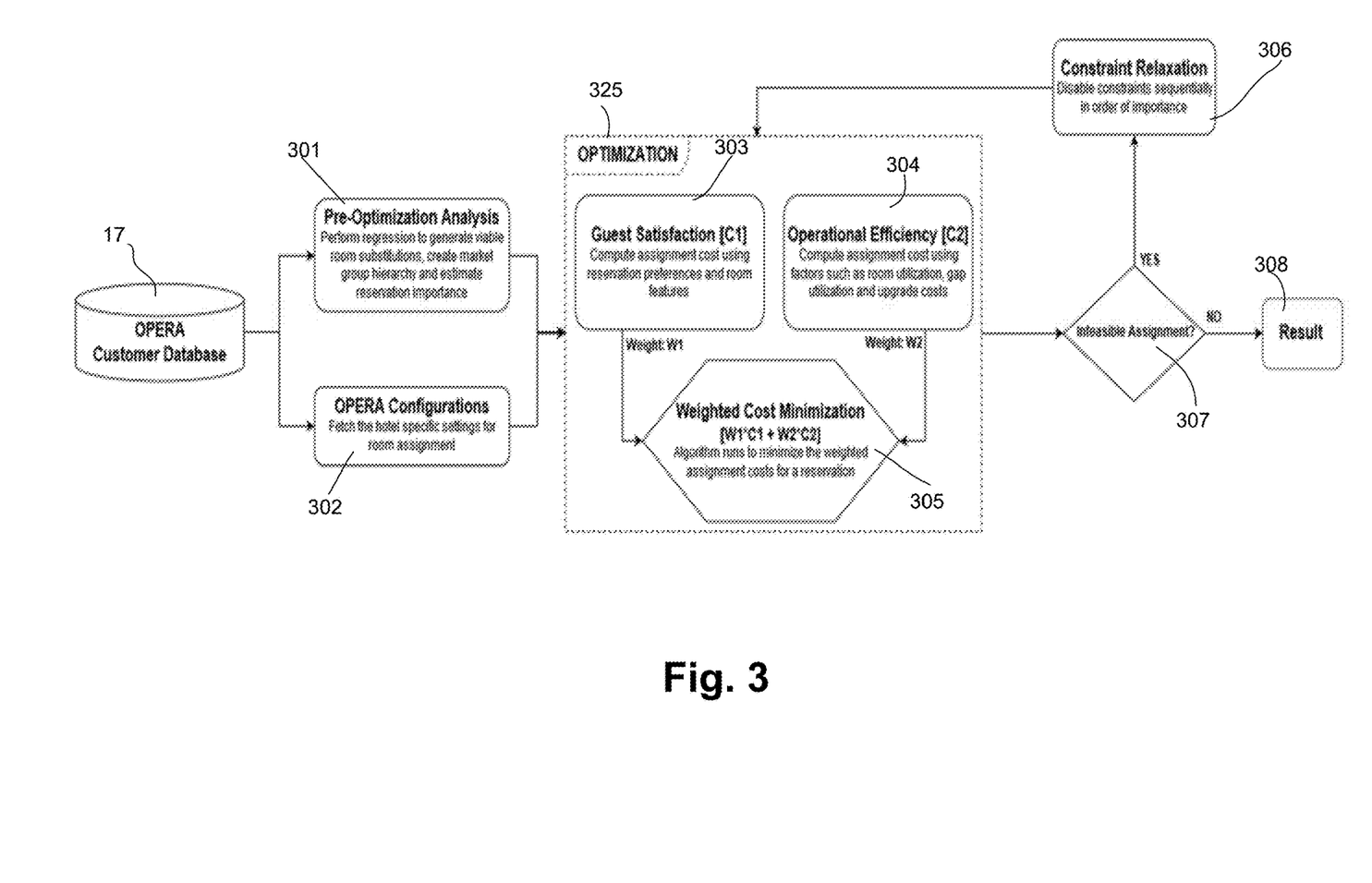
FIG. 3 is a flow diagram that illustrates the functionality of the room assignment optimization module of FIG. 1 in accordance to embodiments.

FIG. 3 is a flow diagram that illustrates the functionality of room assignment optimization module 16 of FIG. 1 in accordance to embodiments. In one embodiment, the functionality of the flow diagram of FIG. 3 (and FIG. 7 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Embodiments use an input dataset/database 17 to provide historical reservation data and guest information as needed. In one embodiment, input dataset 17 is an "OPERA" database from Oracle Corp. and includes details on guests of a single hotel or a group of related hotels such as a chain of hotels as well as available rooms. In other embodiments, a database of data regarding guests and rooms for any type of PMS can be used.

Database 17 further stores constraints used by embodiments for optimization. The constraints include both hard and soft constraints. In embodiments, the hard constraints include: (1) No double-booking; (2) Ensure the same room for the entire length of a reservation; and (3) Non-smoking/smoking/ADA-accessible room requests must be honored. The soft constraints include: (1) Guest importance; (2) Market group importance; (3) Room upgrades; (4) Room utilization; and (5) Room feature requests (e.g., floor preference, elevator proximity, adjacent rooms for multi-room reservations). In contrast to embodiments, known automated room assignment solutions generally rely on a rule-based algorithm which is able to satisfy the hard constraints well, but is generally unable to holistically evaluate the soft constraints due to the lack of comparative cost analyses, and generally handles reservations sequentially, disregarding the other bookings in the planning horizon.

At 301, embodiments perform pre-optimization analysis which includes performing linear regression to generate viable room substitutions, create market group hierarchy and estimate reservation importance. To determine a room category hierarchy, embodiments use linear regression to determine an "Importance Score" for each room category using historical reservation data including room category, room features and rate code as follows:

1. RoomRate\$~$\Sigma_j \beta_j \text{feature}_j + \Sigma_k \gamma_k \text{rateCode}_k$+regularizationTerm
2. RoomRate\$~$\beta$ roomCategory+$\Sigma_k \gamma_k \text{rateCode}_k$+regularizationTerm The hierarchy is used to determine which room substitutions can be considered as viable room upgrades.

To determine a market group hierarchy, the total reservation revenue aggregated for all guests within each market group is utilized to establish a default hierarchy. This hierarchy is used to prioritize guests while assigning room upgrades Embodiments determine reservation importance using rule-based or regression-based algorithms. For rule-based, embodiments combine the membership levels and the VIP status of the incoming guests to establish a guest priority list. For regression-based, embodiments estimate the revenue potential and repeat potential of the guest using historical data to determine their importance.

At 302, embodiments fetch hotel specific setting/configurations from database 17, which include user-customizable settings to control the hard and soft constraints in the algorithm. The settings include upgradeable rooms that include a user-overridable list of substitutable rooms with the default determined from the room category hierarchy analysis. A market group ranking includes a user-overridable list of market groups (e.g., Leisure, Package, Conference, etc.) ordered by importance with the default determined from the market group hierarchy analysis. Upgrade rooms includes a setting to control whether to enable the algorithm to consider higher-than-booked room categories during assignment. Preferred market groups include a default list of market groups to consider for upgrades when "Upgrade Rooms" is enabled. Exclusions include a list of floors to exclude from consideration when assigning rooms and, when enabled, exclude rooms with statuses such as "Dirty" and "Out of Service". An optimization objective uses relative weights to balance the following multiple objective functions:

Operational Efficiency: uneven room wear and tear, gaps in assignments, room upgrades.

Guest Satisfaction: mismatch between guest's preferences and assigned room features.

The functionality at 301 and 302 can be considered pre-processing functionality. Then, at 325 the "optimization" is implemented. At 303, guest satisfaction optimization computes the assignment cost ("C1") using reservation preferences and room features. Each reservation has certain "Reservation Preference" codes associated with it. These requests are matched to codes of the features present in a room. A larger deviation from a perfect match results in a higher assignment cost for guest satisfaction (C1).

Figure 4:
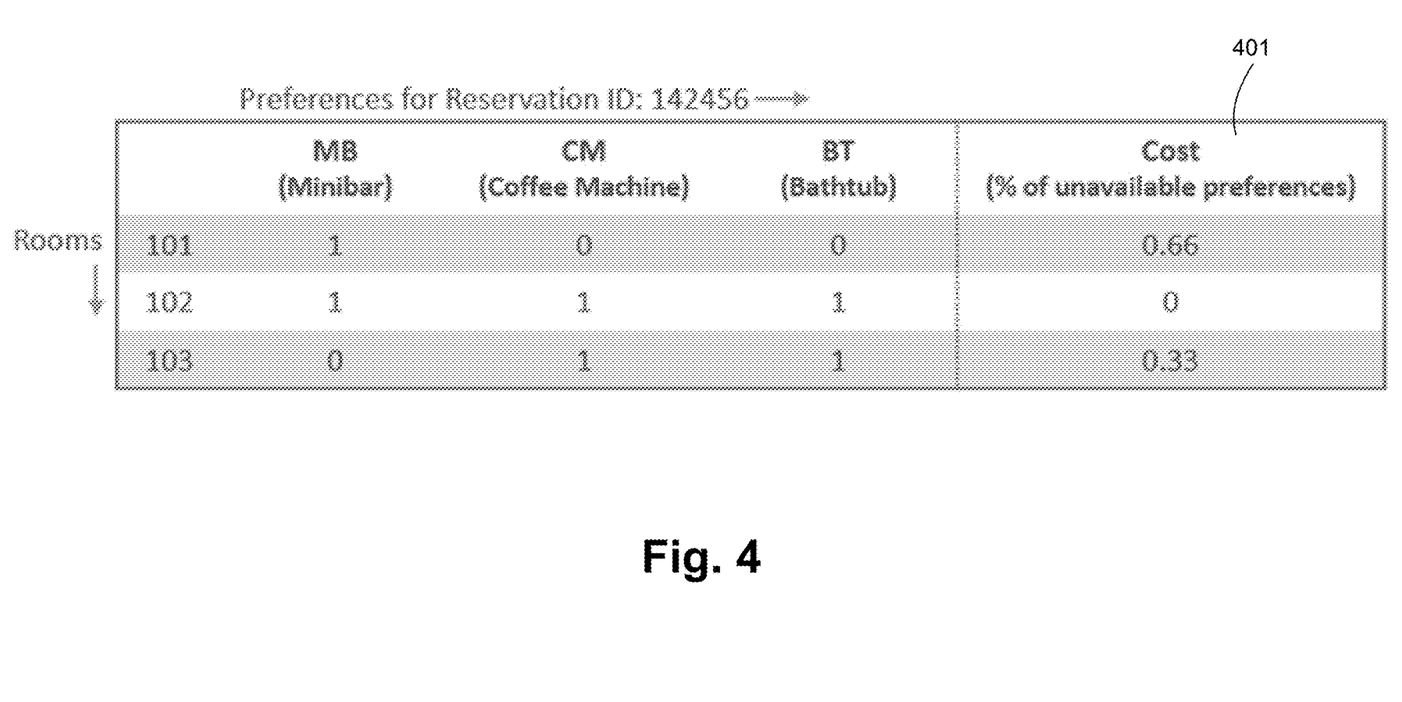
FIG. 4 illustrates an example of guest satisfaction optimization in accordance to embodiments.

FIG. 4 illustrates an example of guest satisfaction optimization in accordance with embodiments. FIG. 4 is for reservation ID #142456 requested for a room with a minibar, a coffee machine, and a bathtub. The computed costs are shown at column 401.

At 304 of FIG. 3, operation efficiency optimization computes the assignment cost ("C2") using factors such as room utilization, gap utilization and upgrade costs. For room utilization, embodiments aim to minimize wear and tear of a room by tracking the occupancy rate for a certain period: (=Days Occupied/Total Days). A higher cost is associated with a room which has a higher occupancy rate. For gap utilization, embodiments avoid small gaps, in terms of days, between two reservations in a particular room. This enables efficient management of walk-in guests and last minute bookings. The cost is calculated as a function of the number of days the room remains unoccupied between two consecutive reservations. For upgrade costs, embodiments minimize the cost of reservation upgrades in the event of overbooking. The cost is calculated as a function of the room category and reservation importance and ensures that valuable guests are upgraded first. These costs are scaled and combined to yield the cost for operation efficiency (C2).

At 305, weighted cost minimization optimization minimizes the weighted assignment cost for a reservation. Embodiments derive the assignment cost for each reservation-room pair by combining the costs for guest satisfaction (C1) and operational efficiency (C2) with the hotel's optimization objective weights (W1, W2) as a cost matrix as follows: Overall objective cost=(W1*C1)+(W2*C2). In embodiments, the weights can be manually assigned by the hotel to emphasize either guest satisfaction or operational efficiency, or the weights can be automatically assigned based on some pre-defined factors. The matrix includes all possible reservation-to-room assignments, and the optimized solutions that solves the assignment problem is the best feasible selection of the matrix elements.

In one embodiment, the generated cost matrix is consumed by a Hungarian Optimization method (or "Hungarian Assignment algorithm") built with a look-ahead modification that helps account for future reservations when allocating rooms for any particular day. Other possible solutions include a greedy heuristic that can be used to order reservations by their importance and find the lowest-cost room assignment for each of them sequentially, or a Mixed Integer Linear Program ("MILP") using powerful commercial solvers such as Gurobi and CPLEX can be leveraged to find the optimal solution to such a problem. However, the greedy heuristic delivers a solution that is too far from optimal and the MILP takes too long to deliver an optimal solution and is usually difficult to deploy as it requires installation of the special licensing software. In contrast, embodiments, in using the Hungarian Assignment algorithm, disclosed in detail below, have a desirable balance between the solution quality and computation time.

Figure 5:
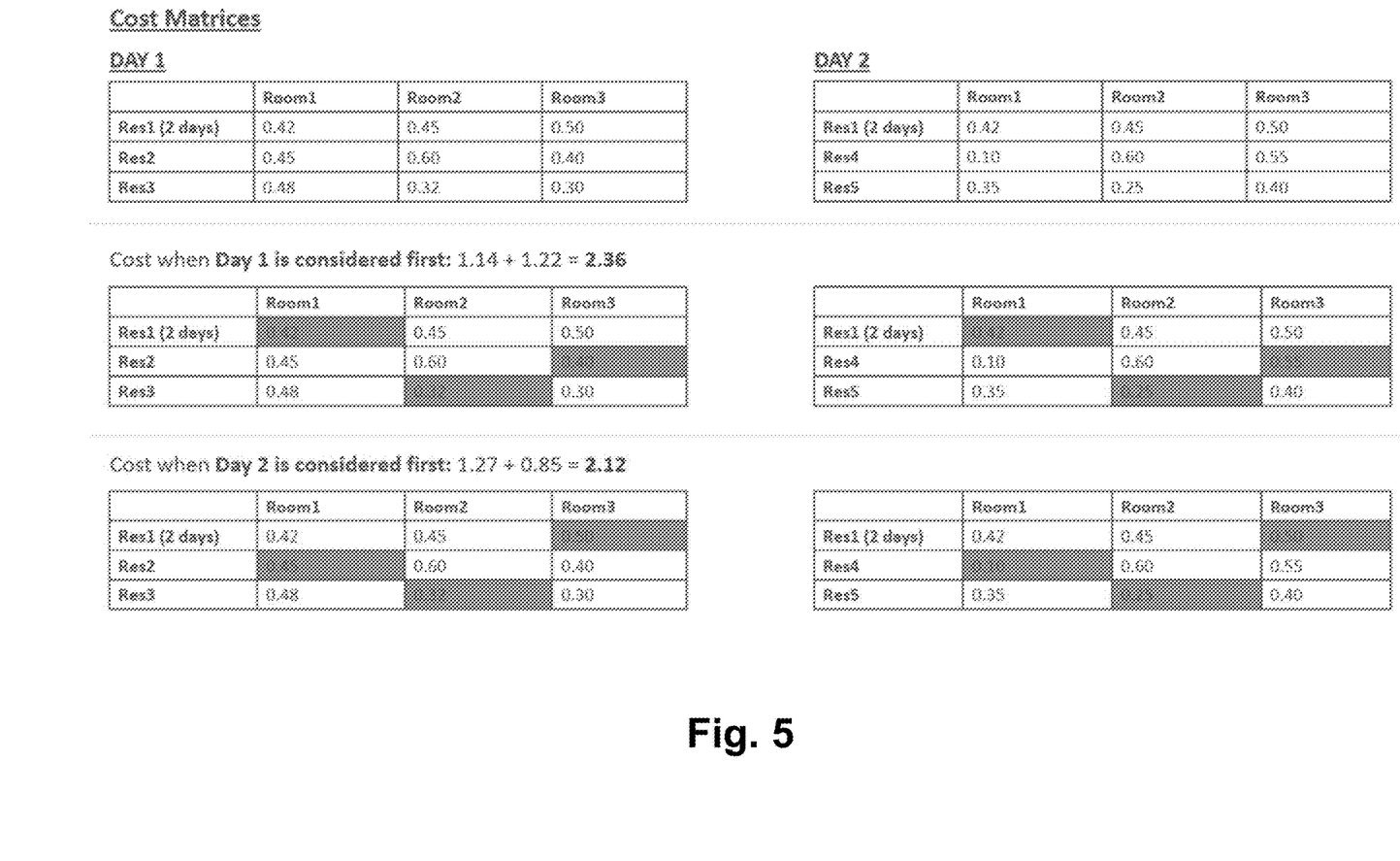
FIG. 5 illustrates an example of weighted cost minimization in accordance to embodiments.

FIG. 5 illustrates an example of weighted cost minimization in accordance to embodiments. The example of FIG. 5 is a simplified example for three rooms, three reservations, and two day. As shown, the cost differs depending on whether day 1 or day 2 is considered first, which illustrates that the simple greedy approach may deliver a suboptimal solution depending on the order of the days in which the rooms are assigned. Since trying all possible perturbations of the days in the planning horizon becomes computationally infeasible as the horizon grows even moderately, it shows the impracticality of the greedy heuristic approach.

At 306 and 307, embodiments relax constraints by disabling constraints sequentially in order of importance. Embodiments perform an iterative removal of conditional checks in order to find a feasible assignment. In embodiments, the following constraints as set at 302 from the configuration are initially used in the following order: Upgrade Rooms ("UGR"), Preferred Market Groups ("PMG"), and Room Status Restriction ("RSR").

If infeasible at 307, embodiments relax these constraints in the above-specified order and attempt a fresh run of the optimization logic at 325. Finally, if the algorithm still fails to arrive at a feasible solution, embodiments reset the status of all constraints, restrict the reservation window to only the first day and restart the optimization process with this new window. In this case the solution is feasible if there is no double-booking of the rooms, that is, no two reservations are assigned to the same room.

Referring again to optimization 325, solving this disclosed problem of hotel room assignment is an NP-hard problem (i.e., it belongs to a wide class of problems for which no known fast polynomial-time solution currently exists). However, embodiments formulate and solve the problem as a multi-commodity flow problem with zero-one (i.e., Boolean) variables. Although this problem cannot exactly be solved in polynomial-time, embodiments utilize an approximation approach that is close to the optimal and exceeds the solutions obtained by manual room assignment as compared with historical data provided by hotel operators.

Embodiments implements Lagrangean Relaxation, which consists of relaxing, or removing, some of the problem constraints in order to come up with a simpler problem that can be efficiently solved by a polynomial or another fast algorithm. The relaxed constraint is not eliminated completely but becomes part of the objective function carrying certain penalties for its violation to form a so-called Lagrangean Objective. By determining the correct values of the penalty coefficients, the problem can be solved to optimality for the continuous variables. When the solution variables are discrete or zero-one, as with embodiments, this approach provides a near-optimal approximate solution.

The Lagrangean optimization approach of embodiments is also augmented by a limited combinatorial enumeration search, which includes perturbations of the initial solution allowing different starting points in order to escape obtaining only locally optimal solution and post-optimization augmentation of the solution to ensure that there are no better similar solutions to the problem.

Embodiments formulate the optimized reservations problem as a multi-commodity flow problem with zero-one variables. One known way to solve this type of a problem using Lagrangean relaxation is to relax the edge capacity constraints and penalize the violation of these constraints with the Lagrangean multipliers. In the context of the room assignment optimization problem, it means allowing several reservations to be assigned to the same room on any night of the stay.

However, in contrast to this known approach, embodiments keep the constraints for the first night of the stay in place and solve the relaxed problem as a so-called assignment problem in the bi-partite graph, which provides a tighter formulation by keeping some of the constraints in place while still allowing a solution by a fast strongly polynomial algorithm. Embodiments allow for obtaining the exact optimal solution for the case of single night reservations even when the reservations can start over the period of several days. On the other hand, when multiple night reservations have different arrival dates, embodiments add certain penalties to the rooms on the nights when there could be multiple reservations assigned to the same room. Finally, embodiments guarantee satisfaction of the constraints by verifying single reservation-to-room allocations and if violated, assign rooms on a day-by-day basis as its final step.

Embodiments implement a type of "Greedy" algorithm that orders reservations based on their importance and finds the lowest cost room assignment for each of them. However, embodiments perform a post-assignment swap to improve the solution. Embodiments further implement a type of "Hungarian" algorithm heuristic that starts with day 1 (i.e., the current day) to find the optimal assignment for that day reservations using available rooms. However, embodiments vary the order of the days and find the best assignment. Embodiments further implement a type of "Lagrangean Relaxation" that runs the assignment of the reservations disregarding the double-booking rule. Embodiments then add penalties for the double-booked rooms, and keep increasing the penalties until there is no double-booking.

Embodiments use the following integer programming formulation that utilizes two constraints for implementing optimization 325 of FIG. 3:

Notation:
$a_{ij}$="cost" of assigning room i to reservation j
$x_{ij}$=assignment decision variable; $x_{ij} \in \{0,1\}$; $x_{ij}=0$ if room i is infeasible
min $\Sigma_{ij} a_{ij} x_{ij}$ Subject to: $\forall j: \Sigma_{i \in I} x_{ij}=1$ and $\forall i \in I, \forall t: \Sigma_{j \in J_t} x_{ij} \leq 1$ (i.e., the two constraints)

where $J_t$ is the set of reservations "active" on day t.

Embodiments implement a multicommodity network flow formulation as follows for also implementing optimization 325 of FIG. 3 (i.e., as an equivalent to the above integer programming formulation):

$x_{ij}^t$=0-1 flow variable indicating whether reservation j is assigned to room i on day t.

Network structure guarantees no room switching

Minimize multicommodity flow cost s.t.:

Flow conservation constraints

Link capacity constraints: $\forall i, t: \Sigma_j x_{ij}^t \leq 1$     Possible to drop index t since $x_{ij}^t = x_{ij} \forall t \in T$ (j)

Figure 6:
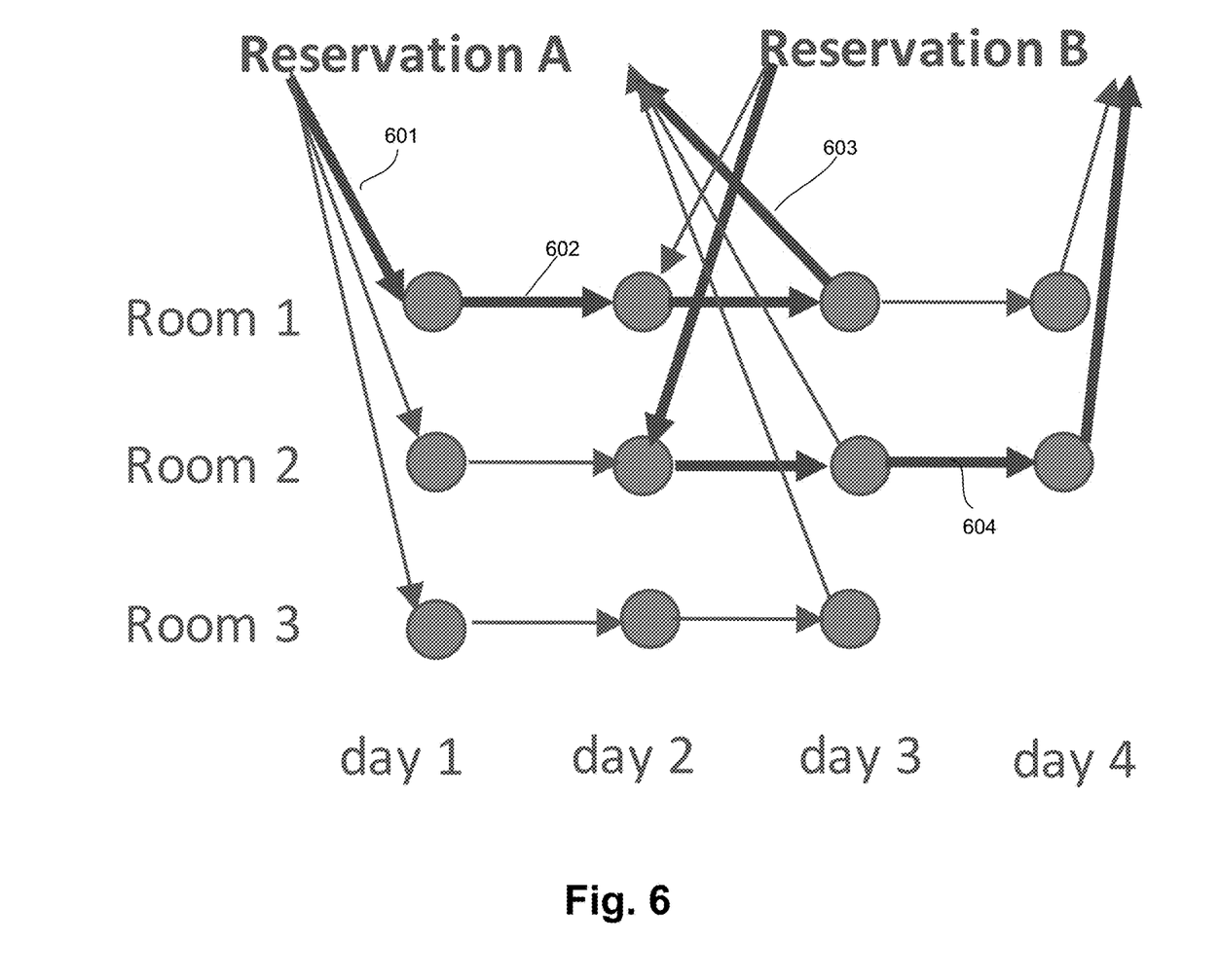
FIG. 6 illustrates the network flow formulation in accordance to embodiments.

FIG. 6 illustrates the network flow formulation in accordance to embodiments. FIG. 6 shows two reservations, one of which (Reservation A) starts on day 1 and the other (Reservation B) starts on day 2. The arrows represent all possible paths that can be taken, and the thicker arrows (e.g., arrows 601-604) represent the chosen optimized path. FIG. 6 represents the above described multi-commodity flow formulation. In FIG. 6, the nodes are arranged in the rows corresponding to the particular rooms and columns corresponding to the days of planning horizon. Each horizontal link corresponds to the night of stay. The diagonal links correspond to check-ins and check-outs of the reservations. Each reservation can theoretically be assigned to any room at the check-in on the arrival day and thus forms the path that ends at the check-out on the departure day. FIG. 6 is a simplified example, and the actual examples may include nodes and possible paths corresponding to both the number of rooms times the number of days, and the number of rooms times the number of reservations.

Embodiments implement Lagrangean relaxation as follows, which are obtained from the above integer programming formulation by relaxing the second constraint, $\forall i \in I, \forall t: \Sigma_{j \in J_t} x_{ij} \leq 1$, and adding it to the objective function with the Lagrangean penalty multiplier $\theta_{it}$:

min $\Sigma_{ij} a_{ij} x_{ij} + \Sigma_{it} \theta_{it}(\Sigma_{j \in J_t} x_{ij} - 1)$     s.t.:

$\forall j: \Sigma_{i \in I} x_{ij}=1$

$\forall i \in I, \forall t: \Sigma_{j \in J_t^0} x_{ij} \leq 1$     where $J_t^0$=set of reservations starting ("check-in") on day t     Solved as assignment problem (fast, strongly polynomial algorithm)

$k^{th}$ iteration update for penalty $\theta_{it} \rightarrow \theta_{it} + \alpha_k(\Sigma_{j \in J_t} x_{ij} - 1)$, $$\alpha_k = \frac{\alpha_0}{k}$$

Figure 7:
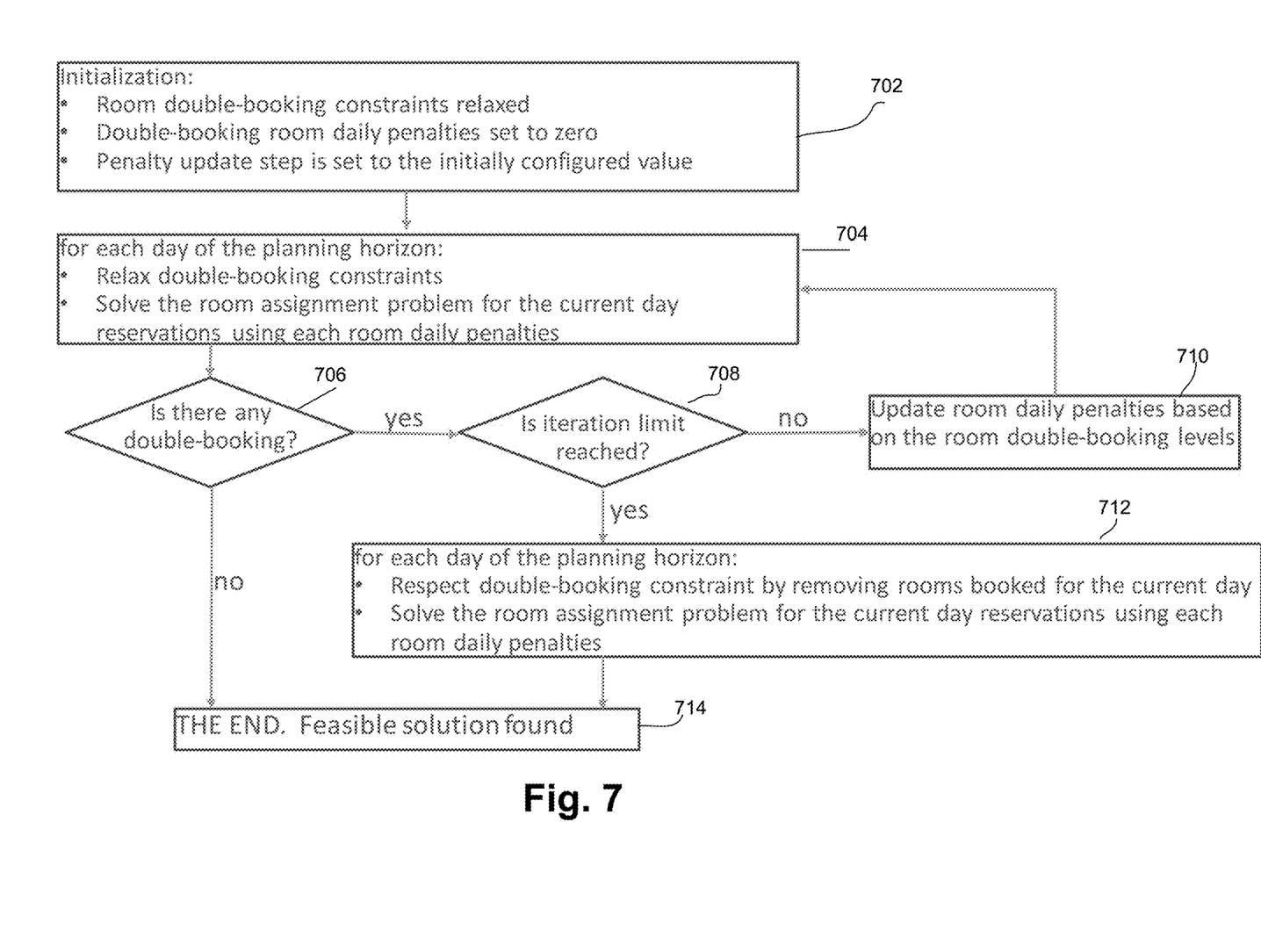
FIG. 7 is a flow diagram that illustrates the functionality of the room assignment optimization module of FIG. 1 in accordance to embodiments.

FIG. 7 is a flow diagram that illustrates the functionality of room assignment optimization module 16 of FIG. 1 in accordance to embodiments. FIG. 7, in particular, focuses on the functionality of optimization 325 of FIG. 3.

At 702, the optimization is initialized by relaxing the room double-booking constraints, setting double-booking room daily penalties to zero, and setting the penalty update step to the initially configured value. In one embodiment, at 702, the solution is initialized by using the cost obtained from 305 of FIG. 3 from the guest satisfaction and operational efficiency components of 303 and 304, respectively. Further, at 702 the Lagrangean penalties are set to zero and the penalty update step is set to an initial value of 0.01.

At 704, for each day of the planning horizon, double-booking constraints are relaxed and the room assignment problem is solved for the current day reservations using each room daily penalties. At 704 the above described Lagrangean relaxation of the integer programming formulation is solved.

At 706, it is determined if there is any double-booking. 706 checks the problem feasibility by checking the rooms are not double-booked for any night. If there is any double-booking and the iteration limit has not been reached (i.e., yes at 706), at 708 it is determined if the iteration limit is reached. In one embodiment, the iteration limit is set to 10.

If no at 708, the room daily penalties are updated based on the room double-booking levels at 710 using the above described Lagrangean relaxation. Functionality resumes/reiterates at 704.

If yes at 708 (i.e., the iteration limit is reached), at 712, for each day of the planning horizon, embodiments respect the double-booking constraint by removing rooms booked for the current day, and solve the room assignment problem for the current day reservations using each room daily penalties. At 712, the hard double-booking constraints are imposed and the problem is solved on the day-by-day basis using the previously computed Lagrangean penalties for room assignment.

If no at 706 (i.e., no double booking found), or after 712, the feasible solution has been found at 714 (i.e., the room assignment is optimal).

Experimental results demonstrate that embodiments improve the functioning of the computer while obtaining results close to a known optimal MILP solution. The experiment used 1,000 rooms, ~150 daily arrivals, 4 days stay average and a planning horizon that varies from 7 to 21 days.

Figure 8A:
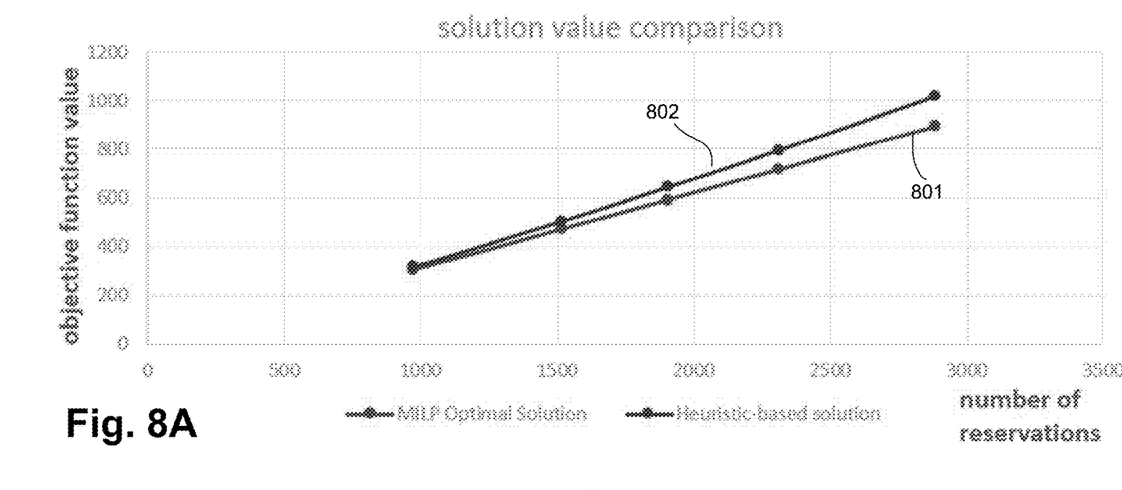
FIG. 8A is a graph illustrating an objective function value vs. number of reservations in accordance to embodiments of the invention.
Figure 8B:
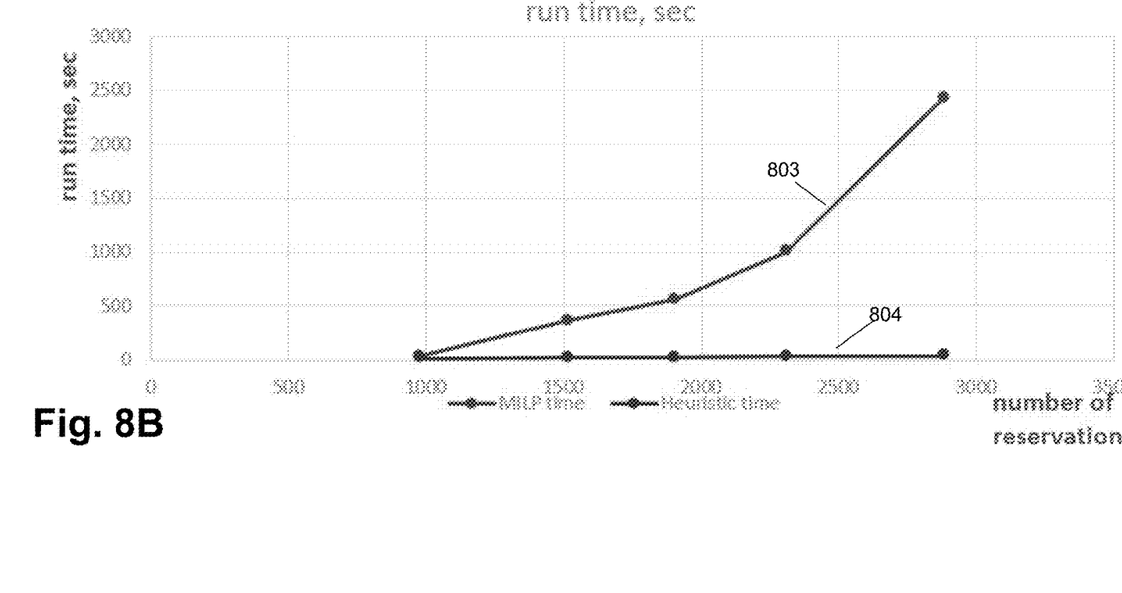
FIG. 8B is a graph illustrating run time vs. the number of reservations in accordance to embodiments of the invention.

FIG. 8A is a graph illustrating an objective function value vs. number of reservations in accordance to embodiments of the invention. The objective function is the entire cost of the solution as described above representing the assignment cost that includes the hotel operating cost component and the cost of not providing the hotel guest with the desired room features. Since the optimization objective is to minimize the cost, the lower value corresponds to a better solution. 801 represents an optimal MILP solution, and 802 represents a solution in accordance to embodiments. As shown, per the objective function value of the Y-axis, both solutions provide similar results. FIG. 8B is a graph illustrating run time vs. the number of reservations in accordance to embodiments of the invention. 803 represents an optimal MILP solution, and 804 represents a solution in accordance to embodiments. As shown, as the number of reservations increases, the required run time of the MILP solution increases substantially while the run time for embodiments of the invention remain relatively low and constant. Therefore, the functioning of the computer is improved with embodiments of the invention.

Currently, with known hotel management solutions, most of the room assignments is performed manually by the hotel operators on a daily basis for the arriving guests, which takes of lot time and effort. Embodiments allow for the automation of the room assignment process while preserving or improving its quality. By deciding on the room assignment earlier in the day, it allows extra time for cleaning and preparing the assigned rooms. Once the optimized room reservations are decided, embodiments generate control signals which cause specialized equipment to responsively operate. For example, a room key generation machine that can either program a generic key blank, or create a new key, receives the control signals and generates corresponding keys for the determined rooms that have been assigned. Further, a robotic device can receive control signals to enter an assigned room and assist in cleaning the room and making sure appropriate supplies are stocked (or provide supplies if needed), as well as performing necessary room inspection (e.g., to determine if the room is ready for a new arrival).

As disclosed, embodiments of the room assignment optimization system speed up the room assignment process while providing a high-quality solution that is able to cater to the needs of both the hotel's operations as well as a guest's experience. It provides an automated solution by deploying a very lightweight software architecture without dependency on any third-party software, which also saves licensing costs. Experiments show that embodiments can assign rooms to several thousands of reservations in less than a minute of computational running time. Further, embodiments allow for customized execution of the assignment according to a hotel's preference for operational efficiency or guest satisfaction, which they can toggle according based on travel seasonality or hotel type.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of optimized room assignments for a hotel, the method comprising:
   receiving a plurality of hard constraints and soft constraints;
   receiving reservation preferences and room features;
   performing optimization, the optimization comprising:
      determining a guest satisfaction assignment cost based on the reservation preferences and room features;
      determining an operational efficiency assignment cost comprising room utilization, gap utilization and room upgrade costs;
      generating a weighted cost matrix based on the guest satisfaction assignment cost and the operational efficiency assignment cost, the generating the weighted cost matrix comprising, for each of a plurality of reservation-room pairs, combining the corresponding guest satisfaction assignment cost and the corresponding operational efficiency assignment cost with objective weights;
      generating preliminary room assignments based on the weighted cost matrix;
   when the preliminary room assignments are feasible, the preliminary room assignments are the optimized room assignments comprising a feasible selection of elements of the matrix;
   when the preliminary room assignments are infeasible, relaxing one or more constraints and repeating the performing optimization until the preliminary room assignments are feasible, the optimization comprising solving a multi-commodity network flow problem with Boolean variables; and
   further comprising generating a control signal that corresponds to the preliminary room assignments and, in response to the control signal, automatically electronically programming one or more room keys that correspond to the preliminary room assignments.

2. The method of claim 1, wherein constraints are relaxed by disabling constraints sequentially in order of importance.

3. The method of claim 1, wherein the preliminary room assignments are feasible when there is no double-booking.

4. The method of claim 1, the optimization comprising:
   relaxing double-booking constraints and setting double-booking room daily penalties to zero;
   for each day of a planning horizon, relaxing double-booking constraints and solving a room assignment problem for the day using room daily penalties and Lagrangean relaxation;
   when there is double booking, updating the room daily penalties based on a level of the double-booking and repeating, for each day of the planning horizon, relaxing double-booking constraints and solving the room assignment problem for the day using room daily penalties and Lagrangean relaxation.

5. The method of claim 4, the optimization further comprising:
   determining if an iteration limit has been reached;
   when the iteration limit has been reached, imposing the double-booking constraints and solving the room assignment problem using the updated room daily penalties.

6. The method of claim 1, further comprising:
   performing pre-optimization analysis comprising performing linear regression to generate viable room substitution and creating a market group hierarchy and estimate reservation importance.

7. The method of claim 1, wherein the generating preliminary room assignments based on the weighed cost matrix comprises a Hungarian algorithm heuristic to solve an assignment problem comprising an integer programming formulation utilizing the guest satisfaction assignment cost and the operational efficiency assignment cost as constraints.

8. A non-transitory computer readable medium having instructions stored thereon that, when executed by one or more processors, cause the processors to optimize room assignments for a hotel, the optimizing comprising:
   receiving a plurality of hard constraints and soft constraints;
   receiving reservation preferences and room features;
   performing optimization, the optimization comprising:
      determining a guest satisfaction assignment cost based on the reservation preferences and room features comprising room utilization, gap utilization and room upgrade costs;
      determining an operational efficiency assignment cost;
      generating a weighted cost matrix based on the guest satisfaction assignment cost and the operational efficiency assignment cost, the generating the weighted cost matrix comprising, for each of a plurality of reservation-room pairs, combining the corresponding guest satisfaction assignment cost and the corresponding operational efficiency assignment cost with objective weights;
      generating preliminary room assignments based on the weighted cost matrix;
   when the preliminary room assignments are feasible, the preliminary room assignments are the optimized room assignments comprising a feasible selection of elements of the matrix;
   when the preliminary room assignments are infeasible, relaxing one or more constraints and repeating the performing optimization until the preliminary room assignments are feasible, the optimization comprising solving a multi-commodity network flow problem with Boolean variables; and
   further comprising generating a control signal that corresponds to the preliminary room assignments and, in response to the control signal, automatically electronically programming one or more room keys that correspond to the preliminary room assignments.

9. The computer readable medium of claim 8, wherein constraints are relaxed by disabling constraints sequentially in order of importance.

10. The computer readable medium of claim 8, wherein the preliminary room assignments are feasible when there is no double-booking.

11. The computer readable medium of claim 8, the optimization comprising:
   relaxing double-booking constraints and setting double-booking room daily penalties to zero;
   for each day of a planning horizon, relaxing double-booking constraints and solving a room assignment problem for the day using room daily penalties and Lagrangean relaxation;
   when there is double booking, updating the room daily penalties based on a level of the double-booking and repeating, for each day of the planning horizon, relaxing double-booking constraints and solving the room assignment problem for the day using room daily penalties and Lagrangean relaxation.

12. The computer readable medium of claim 11, the optimization further comprising:
   determining if an iteration limit has been reached;
   when the iteration limit has been reached, imposing the double-booking constraints and solving the room assignment problem using the updated room daily penalties.

13. The computer readable medium of claim 8, further comprising:
   performing pre-optimization analysis comprising performing linear regression to generate viable room substitution and creating a market group hierarchy and estimate reservation importance.

14. The computer readable medium of claim 8, wherein the generating preliminary room assignments based on the weighed cost matrix comprises a Hungarian algorithm heuristic to solve an assignment problem comprising an integer programming formulation utilizing the guest satisfaction assignment cost and the operational efficiency assignment cost as constraints.

15. A hotel room reservation system comprising:
   one or more processors coupled to stored instructions; and
   a database storing reservation preferences and room features;
   the processors configured to receive a plurality of hard constraints and soft constraints and implement an room optimization module that is configured to perform optimization comprising:
      determine a guest satisfaction assignment cost based on the reservation preferences and room features comprising room utilization, gap utilization and room upgrade costs;
      determine an operational efficiency assignment cost;
      generate a weighted cost matrix based on the guest satisfaction assignment cost and the operational efficiency assignment cost, the generate the weighted cost matrix comprising, for each of a plurality of reservation-room pairs, combining the corresponding guest satisfaction assignment cost and the corresponding operational efficiency assignment cost with objective weights;
      generate preliminary room assignments based on the weighted cost matrix;
      wherein, when the preliminary room assignments are feasible, the preliminary room assignments are the optimized room assignments comprising a feasible selection of elements of the matrix;
      wherein, when the preliminary room assignments are infeasible, the processors are configured to relax one or more constraints and repeat the perform optimization until the preliminary room assignments are feasible, the optimization comprising solving a multi-commodity network flow problem with Boolean variables; and
   further comprising generating a control signal that corresponds to the preliminary room assignments and, in response to the control signal, automatically electronically programming one or more room keys that correspond to the preliminary room assignments.

16. The system of claim 15, wherein constraints are relaxed by disabling constraints sequentially in order of importance.

17. The system of claim 15, wherein the preliminary room assignments are feasible when there is no double-booking.

18. The system of claim 15, the optimization further comprising:
   relaxing double-booking constraints and setting double-booking room daily penalties to zero;
   for each day of a planning horizon, relaxing double-booking constraints and solving a room assignment problem for the day using room daily penalties and Lagrangean relaxation;
   when there is double booking, updating the room daily penalties based on a level of the double-booking and repeating, for each day of the planning horizon, relaxing double-booking constraints and solving the room assignment problem for the day using room daily penalties and Lagrangean relaxation.

19. The system of claim 15, the optimization further comprising:
   performing pre-optimization analysis comprising performing linear regression to generate viable room substitution and creating a market group hierarchy and estimate reservation importance.

20. The system of claim 15, wherein the generating preliminary room assignments based on the weighed cost matrix comprises a Hungarian algorithm heuristic to solve an assignment problem comprising an integer programming formulation utilizing the guest satisfaction assignment cost and the operational efficiency assignment cost as constraints.

* * * * *